P. F. HODGES.
Harvesters.

No. 142,231. Patented August 26, 1873.

Witnesses.
Alex? Mahon
G. J. Thomas

Inventor.
Pliny F. Hodges
by A. M. Smith
attorney

UNITED STATES PATENT OFFICE.

PLINY F. HODGES, OF MASSILLON, OHIO, ASSIGNOR OF NINE-TWELFTHS HIS RIGHT TO EDWIN BAYLISS, JAMES O. BROWN, AND FRANCIS T. LOMONT, OF SAME PLACE.

IMPROVEMENT IN HARVESTERS.

Specification forming part of Letters Patent No. 142,231, dated August 26, 1873; application filed March 19, 1873.

*To all whom it may concern:*

Be it known that I, PLINY F. HODGES, of Massillon, county of Stark, State of Ohio, have invented a new and useful Improvement in Harvesting-Machines, of which the following is a full, clear, and exact description, reference being had to the accompanying drawings making part of this specification, in which—

Figure 1:
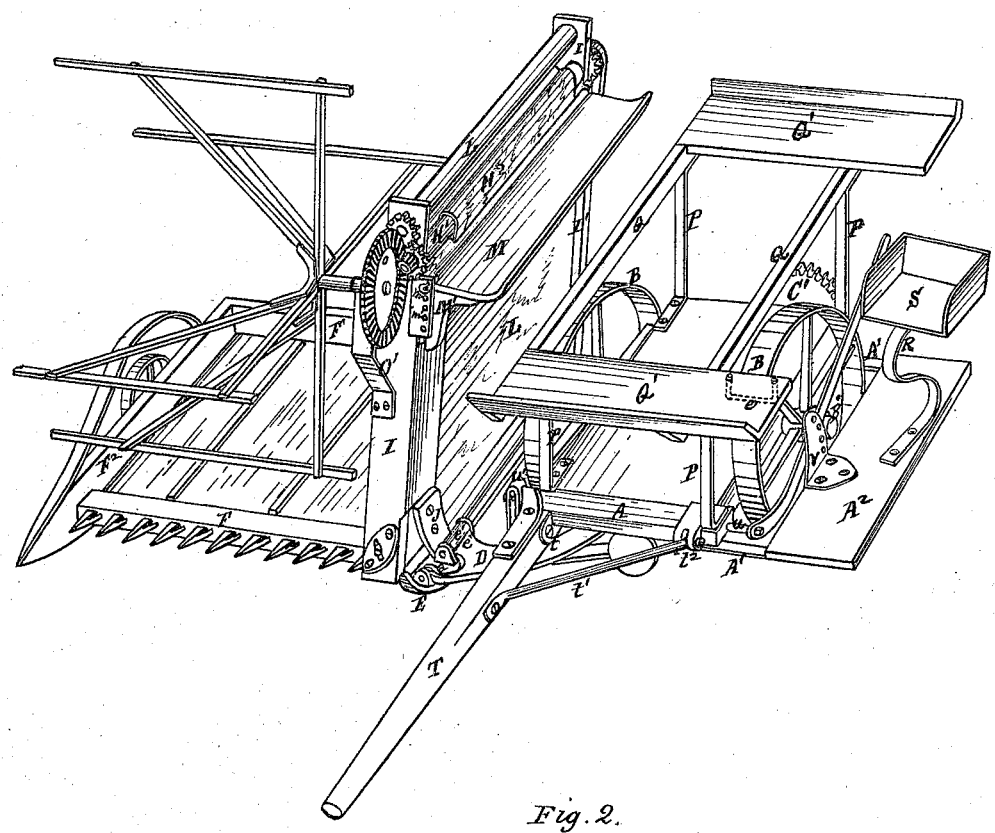
Figure 2:
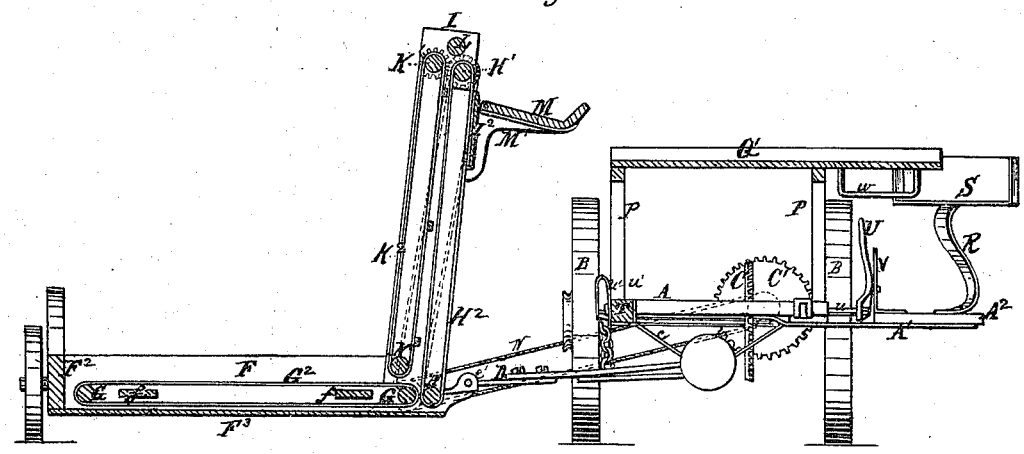

Figure 1 is a perspective view of a harvester embracing my improvements; and Fig. 2 is a front view of the same, partly in section.

Similar letters of reference denote corresponding parts in both figures.

My invention relates to that class of harvesting-machines employing endless-apron carriers and elevators adapted to deliver the cut grain to binders riding on the machine; and, more particularly, to the adaptation of such carriers to use in a two-wheel hinged-platform machine, in such manner as that while the platform is adapted to follow the inequalities of the ground independently of the main frame and carrying-wheels, the relation of the grain-receptacle to the binders will remain substantially the same; and, also, to the adaptation of such machines to be operated without change of the gearing or sickle-driving mechanism usually employed in this class of machines. The invention consists, first, in the employment of an adjustable grain-receptacle, pivoted to the elevator-frame and adapted to conform to the movements of the platform and main frame on their connecting-joints; second, in the combination, with the elevator-aprons, of an upper guide-roller for giving direction to the grain as it leaves the elevator-aprons and insuring its proper delivery to the grain-receptacle; third, in certain details of construction and arrangement, all as hereinafter fully explained.

In the accompanying drawings, A represents a main frame, of any usual or preferred construction, arranged between the two independent drive-wheels B B, which are mounted upon a common axle, $B^1$, and connected therewith by the usual backing-ratchets. The axle $B^1$ has mounted upon it a bevel-wheel, C, from which motion is imparted through a bevel-pinion to a longitudinal countershaft, armed at its rear end with a spur-wheel, $C^1$, which, in turn, imparts motion to a pinion on the rear end of the crank-shaft, which at its forward end is provided with the usual crank or crank-wheel, from which, through the usual pitman, motion is communicated to the reciprocating sickle-bar. The above or any usual arrangement of gearing may be employed which is adapted to drive the sickle in a two-wheel front-cut machine. The crank-shaft is supported below the main frame in pendent or drooping brackets $c$, in front and rear, and to these, or, if preferred, to the frame A itself, and at or near the line of the crank-shaft, are pivoted coupling-arms or braces D—one in front and one in rear of the drive-wheels, the one in front being braced or strengthened in any usual manner, and forked at its outer end to form two points of support, $e\ e'$, for the shoe E hinged thereto, one, $e$, in front, and one, $e'$, in rear of the sickle-head and pitman-rod connecting therewith. The platform-frame is composed of a finger-bar, F, or front-platform bar, connected therewith, a parallel rear bar, $F^1$, an outer longitudinal wheel and divider-bar, $F^2$, a continuous bottom-board or flooring, $F^3$, and stiffening longitudinal slats $f\ f$, Fig. 2. To the divider-bar $F^2$ I attach a grain or carrying wheel, arranged about in line transversely with the tread of the driving-wheels B, said wheels being made adjustable for regulating the height of the outer end of the platform, or applied in any usual or convenient manner. Near the divider-bar, and in suitable bearings in the front and rear platform bars, is mounted an apron-roller, G, and at the inner end of the platform and in about the same horizontal plane with roller G are two similar rollers, G and H, also mounted in bearings in the platform-frame, an endless apron, $G^2$, passing around the rollers G $G^1$, constituting the grain-receiving platform. To the inner end of the platform-bars, in front and rear, are rigidly secured the lower ends of elevator-frame bars I $I^1$, the upper ends of said bars being connected by a longitudinal bar, $I^2$, and further strengthened by elevator-apron rollers H $H^1$ and K $K^1$, and an upper discharging-roller, L, which have their bearings in said elevator-frame bars. The forward bar I, which overhangs the sickle or sickle-end of the pitman, is cut away or shortened sufficiently at its lower end to permit the sickle or pitman to work underneath it; and is connected with the shoe in the rear of the pitman by a strap or angle iron or plate, J, Fig. 1, bolted to the standard I, and also to the hinged shoe E. The rear standard I¹ is hinged, by a similar strap or iron, to the rear coupling or brace-arm, and the platform and elevator-frame, thus hinged to the coupling-arms D, which, in turn, are hinged to the main frame, will be free to follow the surface of the ground at both ends, independently of the movement of the main frame, in a manner well understood. The rollers H H¹ are surrounded by an endless apron or canvas, H², and the rollers K K¹ by a similar apron, K², the movements of the aprons H² and K² being in opposite directions, so that their inner or adjacent faces shall move upward together for carrying up the grain delivered to them by the platform-apron H. The guide or discharging roller L is arranged above and between the rollers H¹ K¹, as shown, and has a movement imparted to it in the same direction with roller K¹, in such manner as that their opposing faces, moving in opposite directions, causes the roller L to deflect the grain from the apron K², and to make it follow the apron H², moving in the same direction with the opposing face of roller L, and thereby causing it to be delivered to the receiver M.

The aprons H² K² are moved, at equal speeds, in opposite direction, as stated, by the following arrangement of driving mechanism: The counter-shaft, carrying the spur-wheel C¹, is provided, at its rear end, with a pulley or sprocket wheel, from which, through a chain or band, N, motion is imparted to a corresponding pulley or wheel on the rear end of platform-apron roller G¹, moving the upward face of said platform-apron inward. A second pulley or wheel on said roller G¹, through a chain or band, (shown in dotted lines, Fig. 2,) drives a corresponding pulley on the rear end of elevator-apron roller H¹, and a spur-gear on the latter, meshing with a corresponding gear on roller K¹ of the second elevator-apron, K², moving it at an equal speed with, but in an opposite direction to, apron H².

The forward end of roller H¹ is also provided with a similar spur-wheel, which meshes with and drives a corresponding spur-wheel on the upper deflecting-roller L, moving it in the same direction with apron-roller K¹, as above explained. The forward end of roller H¹ is also armed with a bevel-pinion, h, formed upon, or connected with, the spur-wheel h¹, said pinion gearing with a bevel-wheel, o, on the inner end of the reel-shaft, which is mounted in suitable bearings in a bracket or standard, o¹, attached to the forward elevator-frame bar I.

The receiver M, into which the grain is discharged from the elevator-aprons, may be of any suitable form and material, the concave form shown being preferred. This is connected with supporting-brackets M¹, and is connected, at its inner edge, to the elevator-frame, by pivots, at m, which may be adjusted higher or lower, for regulating the height of the receiver, by changing the pivots from one to another of a series of perforations in supporting-plates m¹, the brackets M′ abutting against the frame-standards I I′, and preventing the receiver from dropping below a suitable position for retaining the grain deposited in it by the elevator, while, at the same time, they leave the receiver free to rock upward when, by the relative vibration of the elevator and main frame upon their connecting-joints, the receiver is thrown against any portion of the main frame or its binders' supports.

The main frame A, between the wheels B B, is covered with a flooring, which forms the binders' stand, and has attached to it, at its four corners, metallic straps, or other suitable form of standards, P, to the upper ends of which are connected two longitudinal bars, Q, connected at their front and rear ends by binders' tables Q′, placed at a sufficient distance apart to accommodate between them the binders, who, standing upon the flooring of the main frame, take the grain from the receiver M and bind it upon the tables Q′. To the outer or stubble side of the main frame transverse extension-bars A¹ A¹ are connected with the front and rear bars of the main frame A, and said bars, extending beyond or out upon the stubble side of the outer drive-wheel, are connected at their outer ends by, and form the support for, the seat and lever-plank A². R is the spring-seat standard, and S the driver's seat, mounted thereon. T is the tongue, hinged or pivoted to the main frame at t, and also through an oblique stiffening-brace, t¹, at t², in such manner as to permit vertical vibration of the frame relative to the tongue. In rear of the pivot of the tongue is a transverse rock-shaft, u, mounted in suitable bearings on the frame A, and provided at its outer end with an actuating-lever, U, which extends back into convenient position to be operated by the driver on his seat, as shown. The opposite or inner end of said rock-shaft u is provided with a crank-arm, which passes through a loop, w′, connected with the inner side of the frame A, and is connected by a cord or chain with the forward coupling-bar D, in such manner that when the rock-shaft u is rotated by means of the lever U the main and platform and elevator frames will be rocked upon their three several supporting-wheels for raising or lowering the cutting apparatus, as desired. A rack-standard, V, on the seat-plank, in connection with a pin on the spring-lever U, serves to hold the lever, and with it the frames and cutting apparatus, at any desired adjustment. The forward binder's table Q is provided at or near its outer end with a pendent loop, w, through which the reins are passed, said loop serving to hold the reins out of the way of the binder working on said table.

By the construction and arrangement of the parts of the machine as explained it will be seen, first, that the cutting apparatus and its platform and elevator-apron may be readily adjusted to any desired height of cut while the machine is at work; second, that the freedom of movement of the cutters, platform, and elevators, and of the main frame, relative to each other, will be preserved, whatever the height of cut; third, that the grain-receiver may be readily adjusted to correspond to the adjustment of the height of cut or stature of the binders, while at the same time it is so applied as not to interfere with the required freedom of movement between the platform and elevator and the main frame; fourth, that the arrangement of the elevator-apron and guide or deflecting roller is such as to deliver the grain with regularity and certainty to the grain-receiver; fifth, that the elevator-apron frame is arranged to permit the ordinary gearing and pitman to be used for operating the sickle, thereby dispensing with the vibrating lever heretofore used in this class of elevators; and, sixth, that the weight of the driver is removed from the platform and elevator-frame, and placed upon the opposite side of the main frame, adapting the hinged platform and elevator to follow the ground more lightly and easily than it would otherwise do.

Parts of the gearing projecting above the binder's platform may be protected by the usual shields or covers, and parts of the machine not particularly described may be of any usual or preferred construction.

Having now described my invention, what I claim as new, and desire to secure by Letters Patent, is—

1. An adjustable grain-receiver, M, pivoted to the elevator-frame, and adapted to permit the relative movement of the platform and main frame on their connecting-joints, as described.

2. The combination, with the elevator-aprons $H^2$ $K^2$, operating as described, of the upper guide or deflecting roller L, substantially as and for the purpose set forth.

3. The binders' tables mounted on the main frame, the hinged platform and elevator-frame, the grain-receiver, and the driver's seat, arranged relatively to each other and to the main frame and driving-wheels, substantially as described.

4. The binders' tables mounted upon supports on the main frame, in combination with the hinged platform and elevator-frame and pivoted grain-receiver attached to said elevator-frame, substantially as described.

In testimony whereof I have hereunto set my hand this 17th day of March, A. D. 1873.

PLINY F. HODGES.

Witnesses:
WILLIAM B. PORTER,
ISAAC ULMAN.